(12) United States Patent
Suh et al.

(10) Patent No.: US 8,803,948 B2
(45) Date of Patent: Aug. 12, 2014

(54) BROADCAST RECEIVER AND 3D SUBTITLE DATA PROCESSING METHOD THEREOF

(75) Inventors: Jong Yeul Suh, Seoul (KR); Jin Pil Kim, Seoul (KR); Ho Taek Hong, Seoul (KR)

(73) Assignee: LG Electronics Inc., Seoul (KR)

(*) Notice: Subject to any disclaimer, the term of this patent is extended or adjusted under 35 U.S.C. 154(b) by 420 days.

(21) Appl. No.: 13/201,320

(22) PCT Filed: Dec. 1, 2009

(86) PCT No.: PCT/KR2009/007109
§ 371 (c)(1),
(2), (4) Date: Aug. 12, 2011

(87) PCT Pub. No.: WO2010/093115
PCT Pub. Date: Aug. 19, 2010

(65) Prior Publication Data
US 2011/0292175 A1    Dec. 1, 2011

Related U.S. Application Data

(60) Provisional application No. 61/152,234, filed on Feb. 12, 2009.

(51) Int. Cl.
*H04N 13/00* (2006.01)
*H04N 13/04* (2006.01)

(52) U.S. Cl.
USPC .. 348/43; 348/51; 348/E13.003; 348/E13.026

(58) Field of Classification Search
USPC ...................................................... 348/43, 51
See application file for complete search history.

(56) References Cited

FOREIGN PATENT DOCUMENTS

| | | |
|---|---|---|
| CN | 1607750 A | 4/2005 |
| WO | WO 2007/064159 A1 | 6/2007 |
| WO | WO 2008/044191 | 4/2008 |
| WO | WO 2008/044191 A2 | 4/2008 |
| WO | WO 2008/115222 | 9/2008 |
| WO | WO 2008/115222 A1 | 9/2008 |

*Primary Examiner* — Andy Rao
*Assistant Examiner* — Nguyen Truong
(74) *Attorney, Agent, or Firm* — McKenna Long & Aldridge LLP

(57) ABSTRACT

A broadcast receiver and a 3D subtitle data processing method thereof are disclosed. A method for processing three dimensional (3D) subtitle data includes receiving, by a receiver, a broadcast signal including 3D subtitle data, extracting, by an extracting unit, subtitle display information for a base view and extended subtitle display information for an extended view from the 3D subtitle data, and controlling, by a controller, a 3D subtitle display using the subtitle display information for the base view and the extended subtitle display information for the extended view.

8 Claims, 6 Drawing Sheets

| Syntax | No. of bits | Mnemonics |
|---|---|---|
| display_definition_segment_EXT ( ) { | | |
|    sync_byte | 8 | bslbf |
|    segment_type | 8 | bslbf |
|    page_id | 16 | uimsbf |
|    segment_length | 16 | uimsbf |
|    dds_version_number | 4 | uimsbf |
|    display_window_flag | 1 | uimsbf |
|    reserved | 2 | uimsbf |
|    target_view_position | 1 | uimsbf |
|    display_width | 16 | uimsbf |
|    display_height | 16 | uimsbf |
|    minimum_disparity_value | 16 | uimsbf |
|    maximum_disparity_value | 16 | uimsbf |
|    if (display_window_flag == 1) { | | |
|       display_window_horizontal_position_minimum | 16 | uimsbf |
|       display_window_horizontal_position_maximum | 16 | uimsbf |
|       display_window_vertical_position_minimum | 16 | uimsbf |
|       display_window_vertical_position_maximum | 16 | uimsbf |
|    } | | |
| } | | |

Fig. 1

| Syntax | No. of bits | Mnemonics |
|---|---|---|
| display_definition_segment_EXT ( ) { | | |
| sync_byte | 8 | bslbf |
| segment_type | 8 | bslbf |
| page_id | 16 | uimsbf |
| segment_length | 16 | uimsbf |
| dds_version_number | 4 | uimsbf |
| display_window_flag | 1 | uimsbf |
| reserved | 2 | uimsbf |
| target_view_position | 1 | uimsbf |
| display_width | 16 | uimsbf |
| display_height | 16 | uimsbf |
| minimum_disparity_value | 16 | uimsbf |
| maximum_disparity_value | 16 | uimsbf |
| if (display_window_flag == 1) { | | |
| display_window_horizontal_position_minimum | 16 | uimsbf |
| display_window_horizontal_position_maximum | 16 | uimsbf |
| display_window_vertical_position_minimum | 16 | uimsbf |
| display_window_vertical_position_maximum | 16 | uimsbf |
| } | | |
| } | | |

Fig. 2

| Syntax | No. of bits | Mnemonics |
|---|---|---|
| page_composition_segment_EXT ( ) { | | |
|     sync_byte | 8 | bslbf |
|     segment_type | 8 | bslbf |
|     page_id | 16 | uimsbf |
|     segment_length | 16 | uimsbf |
|     page_time_out | 8 | uimsbf |
|     page_version_number | 4 | uimsbf |
|     page_state | 2 | bslbf |
|     reserved | 2 | bslbf |
|     while (processed_length < segment_length) { | | |
|         region_id | 8 | uimsbf |
|         reserved | 7 | bslbf |
|         target_view_position | 1 | bslbf |
|         region_horizontal_address | 16 | uimsbf |
|         region_vertical_address | 16 | uimsbf |
|         region_disparity_value | 8 | uimsbf |
|     } | | |
| } | | |

2010 — target_view_position row

2020 — region_disparity_value row

Fig. 3

| Syntax | No. of bits | Mnemonics |
|---|---|---|
| region_composition_segment_EXT ( ) { | | |
|     sync_byte | 8 | bslbf |
|     segment_type | 8 | bslbf |
|     page_id | 16 | uimsbf |
|     segment_length | 16 | uimsbf |
|     region_id | 4 | uimsbf |
|     region_version_number | 1 | uimsbf |
|     region_fill_flag | 2 | uimsbf |
|     reserved | 1 | uimsbf |
|     target_view_position | 16 | uimsbf |
|     region_width | 16 | uimsbf |
|     region_height | 16 | uimsbf |
|     region_level_of_compatibility | 16 | uimsbf |
|     region_depth | | |
|     reserved | 16 | uimsbf |
|     CLUT_id | 16 | uimsbf |
|     region_8-bit_pixel_code | 16 | uimsbf |
|     region_4-bit_pixel_code | 16 | uimsbf |
|     region_2-bit_pixel_code | | |
|     reserved | | |
|     while (processed_length < segment_length) { | | |
|         object_id | | |
|         object_type | | |
|         object_provider_flag | | |
|         object_horizontal_position | | |
|         reserved | | |
|         object_vertical_position | | |
|         object_disparity_value | | |
|         if (object_type == 0x01 or object_type == 0x02) { | | |
|             foreground_pixel_code | | |
|             background_pixel_code | | |
|         } | | |
|     } | | |
| } | | |

Fig. 4

| Syntax | Size | Type |
|---|---|---|
| object_data_segment_EXT() { | | |
|     sync_byte | 8 | bslbf |
|     segment_type | 8 | bslbf |
|     page_id | 16 | bslbf |
|     segment_length | 16 | uimsbf |
|     object_id | 16 | bslbf |
|     object_version_number | 4 | uimsbf |
|     object_coding_method | 2 | bslbf |
|     non_modifying_colour_flag | 1 | bslbf |
|     reserved | 1 | bslbf |
|     if(object_coding_method == '00') { | | |
|         top_field_data_block_length | 16 | uimsbf |
|         bottom_field_data_block_length | 16 | uimsbf |
|         while (processed_length < top_field_data_block_length) { | | |
|             pixel-data_sub-block() | | |
|         while (processed_length < bottom_field_data_block_length) { | | |
|             pixel-data_sub-block() | | |
|         if (!wordaligned()) | | |
|             8_stuff_bits | 8 | bslbf |
|     } | | |
|     if(object_coding_method == '01') { | | |
|         number of codes | 8 | uimsbf |
|         for (i ==1, i<=number of codes, i++) | | |
|             character_code | 16 | bslbf |
|     } | | |
| } | | |

BROADCAST RECEIVER AND 3D SUBTITLE DATA PROCESSING METHOD THEREOF

This application is a National Stage Entry of International Application No. PCT/KR2009/007109, filed on Dec. 1, 2009, and claims the benefit of U.S. Provisional Application No. 61/152,234, filed Feb. 12, 2009, both of which are hereby incorporated by reference for all purposes as if fully set forth herein in their entireties.

TECHNICAL FIELD

The present invention relates to a broadcast receiver and a three dimensional (3D) subtitle data processing method thereof, and more particularly to a broadcast receiver for receiving 3D subtitle data and processing the received 3D subtitle data in consideration of either a display condition of a 3D video display device or an effect intended by transmission of subtitle data, and a method for processing the 3D subtitle data.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE OF INVENTION

Technical Problem

Accordingly, the present invention is directed to a broadcast receiver and a 3D subtitle data processing method thereof that substantially obviate one or more problems due to limitations and disadvantages of the related art.

An object of the present invention is to provide a broadcast receiver for receiving 3D subtitle data under a 3D broadcast environment, processing the received 3D subtitle data in consideration of a display condition of a 3D video display device and a 3D effect intended by a content manufacturer, displaying the processed 3D subtitle data, and thus providing a user with more effective and convenient broadcast environments, and 3D subtitle data processing method for use in the broadcast receiver.

Solution to Problem

The object of the present invention can be achieved by providing a method for processing three dimensional (3D) subtitle data, the method including receiving, by a receiver, a broadcast signal including 3D subtitle data, extracting, by an extracting unit, subtitle display information for a base view and extended subtitle display information for an extended view from the 3D subtitle data, and controlling, by a controller, a 3D subtitle display using the subtitle display information for the base view and the extended subtitle display information for the extended view.

In another aspect of the present invention, provided herein is a broadcast receiver including a receiver for receiving a broadcast signal including 3D subtitle data, an extracting unit for extracting subtitle display information for a base view and extended subtitle display information for an extended view from the 3D subtitle data, and a controller for controlling a 3D subtitle display using the subtitle display information for the base view and the extended subtitle display information for the extended view.

Advantageous Effects of Invention

According to embodiments of the present invention, the broadcast receiver can process subtitle data according to a 3D effect of received 3D subtitle data, and display the processed subtitle data.

In addition, according to embodiments of the present invention, a 3D subtitle data processing method maintains compatibility with a 2D legacy broadcast receiver, and at the same time displays subtitle data having a 3D effect through a broadcast receiver capable of displaying 3D video data.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 shows a syntax structure of an extended Display Definition Segment (DDS) acting as extended subtitle display information according to one embodiment of the present invention.

FIG. 2 shows a syntax structure of an extended Page Composition Segment (PCS) acting as extended subtitle display information according to one embodiment of the present invention.

FIG. 3 shows a syntax structure of an extended Region Composition Segment (RCS) acting as extended subtitle display information.

FIG. 4 shows a syntax structure of an extended Object Data Segment (ODS) acting as extended subtitle display information according to one embodiment of the present invention.

BEST MODE FOR CARRYING OUT THE INVENTION

Figure 5:
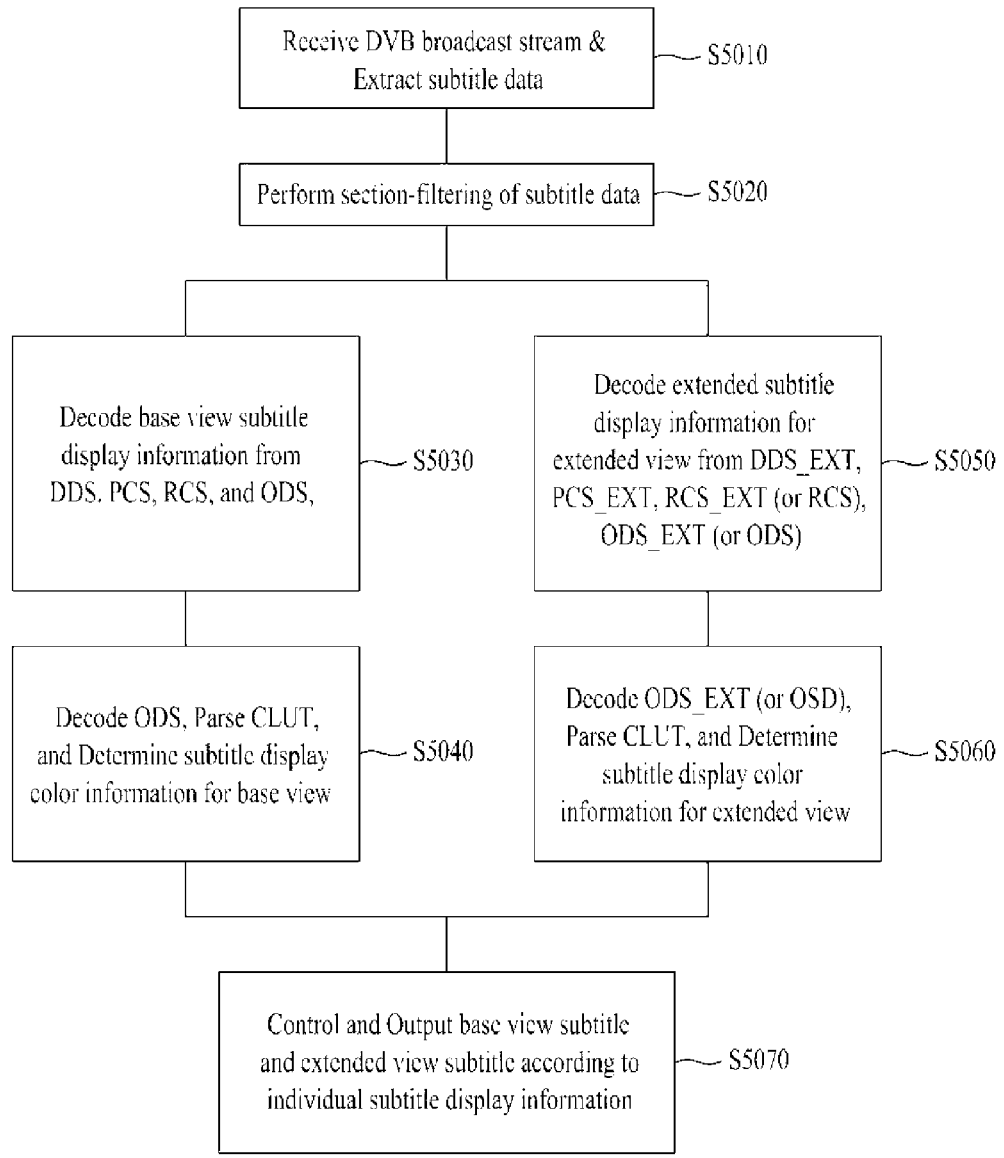
FIG. 5 is a flowchart illustrating a method for receiving and processing 3D subtitle data according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

The 3D image display method includes a stereoscopic imaging scheme in which two view points are considered and a multi-view imaging scheme in which three or more view points are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

When the MVC scheme is additionally applied to the AVC scheme or the right/left image sequences are coded using only the AVC scheme so as to implement the stereoscopic display, one point to be duly considered when broadcasting corresponding 3D content data is compatibility with the 2D broadcast receiver of the related art. For the related broadcast receiver incapable of supporting the 3D image display, if one of right and left view images is encoded and transmitted according to a backward compatible method, the 2D broadcast receiver recognizes and outputs only the corresponding signal, such that it may be possible for a user to view the corresponding content data through the related device. In the following description, a base layer image of a time point where content data is transferred for a legacy broadcast receiver may be referred to as base view video data (or a base video), and an extended layer image transferred for displaying a 3D image may be referred to as extended view video data (or an extended video).

In the case of transferring the base view video data and the extended view video data as described above, a legacy 2D broadcast receiver receives the base video data so that it can display a 2D image, and a 3D broadcast receiver receives base view video data and extended view video data so that it can display a 3D image. However, unexpected problems may occur in a method for displaying subtitle data.

A Digital Video Broadcasting (DVB) system will hereinafter be used as an example of a system for transmitting, receiving, and processing subtitle data.

The term 'Subtitle' in the following description may include not only a subtitle but also displayed image, text data, graphic image, logo, etc which are additionally displayed to basic video data.

The DVB broadcast system transmits subtitle data as a variety of information of a subtitle. At this time, the subtitle data may include not only subtitle display information including configuration, size, position, etc. needed for displaying a subtitle, but also information of a display color of a subtitle. The subtitle display information includes display definition information associated with a display window structure needed for displaying a subtitle, page composition information, region composition information, object data information, and the like. From the viewpoint of a syntax structure for data transmission, display definition information may be referred to as a display definition segment, page composition information may be referred to as a page composition segment, region composition information may be referred to as a region composition segment, and object data information may be referred to as an object data segment.

A related DVB broadcast signal provides only basic subtitle display information. Accordingly, when a 3D broadcast receiver desires to display the basic subtitle display information, the basic subtitle display information may be represented by a 2D broadcast signal or may not be displayed. Therefore, it is necessary to transmit information capable of allowing even the subtitle display information to be displayed in a 3D format, and a broadcast receiver capable of displaying subtitle data in a 3D format using the above-mentioned information and a data processing method thereof are needed.

In the case of displaying a stereoscopic image, left view video data and right view video data are horizontally shifted by a predetermined distance so as to implement a 3D effect, and then displayed. At this time, a variety of representation values (such as a shifted distance) capable of indicating the 3D effect may be used. In accordance with the embodiment of the present invention, a disparity value will hereinafter be used as such a representation value of the 3D effect.

The 3D effect may be acquired from the process in visual perception leading to the sensation of depth from two slightly different projections of the world onto the retinas of the eyes. The difference in the two retinal images may be called horizontal disparity, retinal disparity, or binocular disparity. Hereinafter, for convenience of description and better understanding of the present invention, the difference between the two retinal images will only be referred to as 'disparity'.

For example, in the case of transmitting 3D video data, respective scenes of the 3D video data may have different 3D effects. In this case, disparity values for corresponding scenes are transmitted to a broadcast receiver, so that the broadcast receiver controls and displays the 3D effect using the disparity values. Although other representation values (for example, a depth value, a pixel interval, a screen size, etc.) instead of the above disparity values may be used to display the 3D effect, it should be noted that the embodiments of the present invention will exemplarily use the disparity value for convenience of description and better understanding of the present invention.

In the case of transmitting subtitle data using the related DVB transmission scheme, the 3D broadcast receiver receives base view video data and extended view video data and displays the received base view video data and the received extended view video data as 3D video data. However, the subtitle data has no information for a 3D display, such that it has a disadvantage in that it must display 3D video data as a 2D format. In this case, the subtitle can be displayed only as base view video data or an extended view video data, and a user views the subtitle in a 2D format in a different way from a 3D image, so that the user may experience dizziness and feel fatigue of eyes.

Accordingly, it is necessary to transmit both 3D video data and information of a 3D effect to the related subtitle data. In this way, the 3D effect information may be inserted into the related subtitle display information or it is possible to transmit additional subtitle display information.

In accordance with a method for transmitting additional subtitle data, the stereoscopic image requires two viewpoint video data (i.e., left view video data and right view video data) to display the 3D effect, so that related subtitle display information may be used as subtitle display information of one viewpoint, and subtitle display information of another viewpoint may be additionally transmitted. For example, the related subtitle display information may be set to a subtitle for displaying data at a base view, and subtitle display information of a subtitle to be displayed at an extended view may be additionally transmitted. In accordance with the above-mentioned method, when two subtitle display information is transmitted and at the same time 3D effect information is inserted into one or two subtitle display information and the inserted result is transmitted, a 3D receiver can display subtitle data having the 3D effect in the same manner as in a method for displaying stereoscopic video data.

A method for transmitting the additional subtitle display information may be advantageous to a method in which related subtitle display information is modified and transmitted. In other words, the related 2D broadcast receiver is designed to process and display only related subtitle display information without processing additional subtitle display information undefined in the related subtitle display information, such that the above method for transmitting additional subtitle display information can be easily compatible with the related 2D receiver.

Therefore, the following embodiment of the present invention will disclose a method for transmitting subtitle data by constructing not only related subtitle display information but also other subtitle display information for a 3D display. The above-mentioned additional subtitle display information may also be referred to as extended subtitle display information.

FIG. 1 shows a syntax structure of an extended Display Definition Segment (DDS) acting as extended subtitle display information according to one embodiment of the present invention.

The DDS includes display width information and display height information of a TV image in which a DVB subtitle is rendered. In other words, the DDS indicates a display size of a video image including a subtitle stream to be displayed. In one embodiment of the present invention, an extended DDS (DDS_EXT) shown in FIG. 1 is transmitted, so that a receiver can control an output of a subtitle at an extended view.

Individual fields of the extended DDS shown in FIG. 1 are as follows.

A 'dds_version_number' field may indicate aversion of the extended DDS.

A 'display_window_flag' field may indicate whether a subtitle display set associated with the extended DDS is intended to be rendered in a window within the display size defined by 'display_width' and 'display_height' fields or to be rendered directly within the display size defined by 'display_width' and 'display_height' fields.

A 'display_width' field may indicate a maximum horizontal width in pixels of a display assumed by a subtitling stream associated with the extended DDS.

A 'display_height' field may indicate a maximum vertical height in lines of a display in lines of a display assumed by a subtitling stream associated with the extended DDS.

A 'display_window_horizontal_position_minimum' field may indicate a left-hand most pixel of a subtitle display set with reference to a left-hand most pixel of a display.

A 'display_window_horizontal_position_maximum' field may indicate a right-hand most pixel of a subtitle display set with reference to a left-hand most pixel of a display.

A 'display_window_vertical_position_minimum' field may indicate an upper most line of a subtitle display set with reference to a top line of a display.

A 'display_window_vertical_position_maximum' field may indicate a bottom line of a subtitle display set with reference to a top line of a display.

The above-mentioned fields may be pre-contained in the DDS, and then be transmitted. In this case, information of the same or duplicated fields having been transmitted in the DDS is omitted and as such only the following information may be transmitted.

A 'page_id' field 1020 may indicate an identifier (ID) of a page on which a subtitle is displayed. In case of a 'page_id' value, the subtitle will be displayed on the same page at a base view and an extended view, so that the 'page_id' value may be identical to a 'page_id' value of a DDS corresponding to the base view, and then be transmitted.

A 'segment_type' field 1010 may have a value different from a related DDS value (e.g., 0x14), and must have a specific value (e.g., 0x44) capable of identifying an extended DDS.

A 'target_view_position' field 1030 may indicate a view position to which the extended DDS is applied. In other words, the 'target_view_position' field 1030 indicates viewpoint information for displaying a stereoscopic subtitle. For example, if the subtitle display of a corresponding extended DDS is applied to a left image, the 'target_view_position' field 1030 may be set to a value of '0'. If the subtitle display of a corresponding extended DDS is applied to a right image, the 'target_view_position' field 1030 may be set to a value of '1'.

A 'minimum_disparity_value' field 1040 may indicate a minimum value of a disparity capable of being represented by a left image and a right image. The lower the disparity value of the 'minimum_disparity_value' field 1040 (i.e., the closer the disparity value of the 'minimum_disparity_value' field 1040 is to a negative value), the image forming position gradually moves to the front of the screen.

A 'maximum_disparity_value' field 1050 may indicate a maximum value of a disparity value capable of being represented by a left image and a right image. The higher the disparity value of the 'maximum_disparity_value' field 1050 (i.e., the closer the disparity value of the 'maximum_disparity_value' field 1050 is to a positive value), the image forming position gradually moves to the interior of the screen.

The extended DDS may define the range of a disparity value capable of being allocated when a subtitle is displayed through the 'minimum_disparity_value' field 1040 and the 'maximum_disparity_value' field 1050.

As described above, in association with the DDS, the extended DDS includes not only viewpoint allocation information for individual subtitles, but also 3D effect information (i.e., disparity values), such that a receiver can display a subtitle having the 3D effect.

FIG. 2 shows a syntax structure of an extended Page Composition Segment (PCS) acting as extended subtitle display information according to one embodiment of the present invention.

Referring to FIG. 2, the PCS includes information of constituent components of a displayed subtitle. The PCS may include usage- and positioning-information of at least one region constructing the displayed page. In accordance with one embodiment of the present invention, the extended PCS (PCS_EXT) shown in FIG. 2 is transmitted, such that the receiver can control an output of a subtitle at an extended view.

Individual fields of the extended PCS shown in FIG. 2 are as follows.

A 'page_id' field may indicate an identifier (ID) of a page on which a subtitle is displayed. In case of a 'page_id' value, the subtitle will be displayed on the same page at a base view and an extended view, so that the 'page_id' value may be identical to a 'page_id' value of a DDS corresponding to the base view, and then be transmitted.

A 'page_time_out' field may indicate a period, expressed in seconds, after which a page instance is no longer valid and consequently shall be erased from the screen, should it not have been redefined before that.

A 'page_version_number' field may indicate a version of the extended PCS.

A 'page_state' field may indicate a status of a subtitling page instance described in the extended PCS.

A 'region_id' field may indicate a unique identification of a region within a page. The 'region_id' field may display a subtitle in the same region at the base view and the extended view, such that it is identical to a 'region_id' value of a PCS corresponding to the base view and then transmitted.

A 'region_horizontal_address' field indicates a horizontal address of a top left pixel of this region. The left-most pixel of the active pixels has a horizontal address of zero, and the pixel address increases from left to right.

A 'region_vertical_address' field may indicate a vertical address of a top line of this region. The top line of the frame is a line of zero, and the line address increases by one within the frame from top to bottom.

A 'target_view_position' field 2010 may indicate a view position at which the extended PCS is applied. That is, the 'target_view_position' field 2010 may indicate viewpoint information for displaying a stereoscopic subtitle. For example, if a subtitle display of a corresponding extended PCS is applied to a left image, the 'target_view_position' field 2010 may be set to a value of '0'. If a subtitle display of a corresponding extended PCS is applied to a right image, the 'target_view_position' field 2010 may be set to a value of '1'.

A 'region_disparity_value' field 2020 may indicate a disparity between a first region applied to the left image and a second region applied to the right image. The 'region_disparity_value' field 2020 may indicate a horizontal displacement of other view on the basis of a target view. In the case of transmitting a value of 'region_disparity_value' field 2020, a 'region_horizontal_address' field and a 'region_vertical_address' field may be redundant, so that the redundant fields may be omitted as necessary.

For example, it is assumed that the 'target_view_position' field of the extended PCS has a value of 1, the 'region_disparity_value' field has a value of 20, and the 'region_horizontal_address' field has a value of N. In this case, a subtitle for the extended PCS is displayed as a right image, and a subtitle for the PCS is displayed as a left image. In this case, the horizontal position of the subtitle displayed on the left image is 'N', the horizontal position of the subtitle displayed on the right image is 'N-20', so that a binocular parallax is generated in response to a difference in horizontal positions between the left image and the right image, resulting in the occurrence of a 3D effect.

FIG. 3 shows a syntax structure of an extended Region Composition Segment (RCS) acting as extended subtitle display information.

The RCS includes a list of displayed objects and position information of the objects. In accordance with one embodiment of the present invention, the extended RCS (RCS_EXT) shown in FIG. 3 is transmitted, so that the receiver can control an output of a subtitle at the extended view.

Individual fields of the extended RCS shown in FIG. 3 are as follows.

A 'region_id field' may identify a region for which information is contained in this RCS_EXT.

A 'region_version_number' field may indicate a version of this region.

If a 'region_fill_flag' field is set to a value of '1', the 'region_fill_flag' field means signals indicating that the region is to be filled with the background color defined in the 'region_n-bit_pixel_code' fields in this segment.

A 'region_width' field may specify a horizontal length of this region, and is expressed in number of pixels.

A 'region_height' field may specify a vertical length of the region, and is expressed in number of pixels.

A 'region_level_of_compatibility' field may indicate a minimum type of Color Look Up Table (CLUT) that is necessary in the decoder to decode this region.

A 'region_depth' field may identify an intended pixel depth for this region.

A 'CLUT_id' field may identify a family of CLUTs applied to this region.

A 'region_n(8,4 and 2)-bit_pixel_code' field may specify the entry of the applied n-bit CLUT as background color for the region when the 'region_fill_flag' field is set.

A 'processed_length' field is the number of bytes from the field(s) within a while-loop that has been processed by the decoder.

An 'object_id' field may identify an object shown in the region.

An 'object_type' field may identify a type of object.

An 'object_provider_flag' field may indicate how this object is provided.

An 'object_horizontal_position' field may specify a horizontal position of the top left pixel of this object, and is expressed in number of horizontal pixels, relative to a left hand edge of the associated region.

An 'object_vertical_position' field may specify a vertical position of the top left pixel of this object, and is expressed in number of lines, relative to the top of the associated region.

A 'foreground_pixel_code' field may specify the entry in the applied CLUT that has been selected as the foreground color of the character(s).

A 'background_pixel_code' field may specify the entry in the applied CLUT that has been selected as the background color of the character(s).

A 'target_view_position' field 3010 may indicate a view position at which the extended RCS is applied. That is, the target_view_position' field 3010 may indicate viewpoint information for displaying a stereoscopic subtitle. For example, if the subtitle display of a corresponding extended RCS is applied to a left image, the 'target_view_position' field 3010 may be set to a value of '0'. If a subtitle display of a corresponding extended RCS is applied to a right image, the 'target_view_position' field 3010 may be set to a value of '1'.

An 'object_disparity_value' field 3020 may indicate a disparity between a first object applied to a left image and a second object applied to a right image. A value of the 'object_disparity_value' field 3020 may indicate a horizontal displacement of other view on the basis of a target view.

FIG. 4 shows a syntax structure of an extended Object Data Segment (ODS) acting as extended subtitle display information according to one embodiment of the present invention.

The ODS may include data of a plurality of displayed objects. In one embodiment of the present invention, an extended ODS (ODS_EXT) shown in FIG. 4 is transmitted, so that a receiver can control an output of a subtitle at an extended view.

In case of the ODS, if a disparity field is added in units of each object contained in the region of the extended RCS, a disparity can be adjusted in units of each object using the disparity field, so that different 3D effects can be assigned to each objects contained in the region. Therefore, the ODS for a base view can be applied even to a process for displaying a subtitle at an extended view without any change. At this time, an identifier (ID) identical to that of the ODS used in the base view may be established in the extended RCS, and then transmitted. Alternatively, the broadcast receiver may copy or read a received ODS, such that it may control a subtitle display for the extended view. However, different objects may be used at respective viewpoints. At this time, the extended ODS may transmit data of an additional object. In the embodiment of the present invention, the ODS used for displaying a subtitle for the extended view may be referred to as an extended ODS. In this case, the term 'extended ODS' may include the above-mentioned examples in the following description.

Individual fields of the extended ODS are as follows.

An 'object_id' field may identify within the page an object for which data is contained in this 'ODS_EXT' field.

An 'object_version_number' may indicate a version of this segment data.

An 'object_coding_method' may specify a method used for coding the object.

When a 'non_modifying_colour_flag' field is set to a value of 1, this 'non_modifying_colour_flag' field indicates that the CLUT entry value '1' is a non-modifying color.

A 'top_field_data_block_length' field may specify the number of bytes contained in the 'pixel-data_sub-blocks' field for the top field.

A 'bottom_field_data_block_length' field may specify the number of bytes contained in the 'data_sub-block' field for the bottom field.

A 'processed_length' field may indicate the number of bytes from the field(s) within a while-loop that has been processed by the decoder.

An '8_stuff_bits' field may indicate eight stuffing bits that shall be coded as '0000 0000'.

A 'number_of_codes' field may specify the number of character codes in the string.

A 'character_code' field may specify a character through its index number in the character table identified in the 'subtitle_descriptor' field.

Configuration of subtitle display information for displaying a stereoscopic subtitle in accordance with one embodiment of the present invention and a method for processing the subtitle display information will hereinafter be described.

The configuration and process of a Display Definition Segment (DDS) and a Page Composition Segment (PCS) for displaying a stereoscopic subtitle according to one embodiment of the present invention will hereinafter be described.

In order to allow a receiver to display a stereoscopic subtitle, the receiver must receive subtitle information of two views, i.e., one subtitle information for a base view and the other subtitle information for an extended view. A transmission system can transmit a DDS and a PCS for the base view and the extended DDS and the extended PCS for the extended view.

In this case, in the case where a value incapable of being recognized by a related 2D broadcast receiver is established in a segment type of each of the extended DDS and the extended PCS, and is then transmitted, the related 2D broadcast receiver discards the extended DDS and the extended PCS, and controls a subtitle display using the DDS and the PCS. The 3D broadcast receiver controls a subtitle display for the base view using the DDS and the PCS, and controls a subtitle display for the extended view using the extended DDS and the extended PCS, so that it can display a subtitle having the 3D effect.

Next, the configuration and process of a Region Composition Segment (RCS) for displaying a stereoscopic display according to another embodiment of the present invention will hereinafter be described.

The RCS may include information about a list of displayed objects and information about positions of the objects in the region. In the case of transmitting the extended PCS, a segment type value incapable of being analyzed by the related 2D broadcast receiver may be established in the extended RCS corresponding to a region identifier (ID) contained in the extended PCS so as to prevent operations of the related 2D broadcast receiver from being affected, and the established segment type value is then transmitted. In the case of transmitting the extended RCS in accordance with one embodiment of the present invention, the segment type value may be set to '0x41'. In this case, the extended RCS may have the same structure as in the related RCS. In this embodiment of the present invention, the extended RCS may correspond to a structure acquired when the 'target_view_position' field 3010 and the 'object_disparity_value' field 3020 are deleted from the table structure shown in FIG. 3.

In addition, region composition information for the extended view may be transmitted using the RCS (i.e., segment type=0x11) instead of using the extended RCS. In this case, the region ID of this RCS is unavailable in the received PCS, so that the related 2D broadcast receiver can discard the above RCS.

The configuration and process of an Object Data Segment (ODS) for displaying a stereoscopic subtitle according to another embodiment of the present invention will hereinafter be described in detail.

The RCS or the extended RCS includes object information for constructing the region, and detailed information of a corresponding object may be contained in the ODS and then be transmitted. In this case, in order to prevent operations of the related 2D broadcast receiver from being affected, the extended ODS for describing a subtitle object for the extended view may be transmitted. The extended ODS has the same structure as in the related ODS, and may be assigned another segment type value (e.g., 0x43) different from that of the related ODS and then be transmitted.

In addition, object information for the extended view may be transmitted using the related ODS instead of using the extended ODS. In this case, the object ID of the received ODS is unavailable, so that the related 2D broadcast receiver can discard the above ODS.

In accordance with one embodiment of the present invention, a variety of combinations may be constructed according to configurations of the above-mentioned 'DDS_EXT', 'PCS_EXT' 'RCS_EXT' (or 'RCS'), and 'ODS_EXT' (or 'ODS') and methods for transmitting these segments. That is, the 'DDS_EXT', 'PCS_EXT', 'RCS_EXT', and 'ODS_EXT' are not constructed to have the same 3D effect, and are constructed to have different 3D effects. For example, different disparity values may be assigned to the 'DDS_EXT', 'PCS_EXT', 'RCS_EXT', and 'ODS_EXT'. As a result, a variety of 3D subtitle combinations which have different 3D effects according to pages, regions, and objects of individual subtitles can be displayed.

FIG. 5 is a flowchart illustrating a method for receiving and processing 3D subtitle data according to one embodiment of the present invention.

Referring to FIG. 5, the broadcast receiver receives a DVB broadcast stream, and extracts subtitle data from the received broadcast stream at step S5010. In more detail, the broadcast receiver parses a Program Map Table (PMT) from the DVB broadcast stream, obtains a PID value of a stream having a stream type (stream_type=0x06), and receives a Packet Elementary Stream (PES) corresponding to a DVB subtitle. In this case, the broadcast receiver can obtain basic information of a subtitle from the PMT. In accordance with one embodiment of the present invention, the broadcast receiver determines whether current data is a 3D subtitle by referring to a 'subtitling type' field of a 'subtitling_descriptor' field contained in the PMT, so that it can inform a user of information about the availability or non-availability of a 3D subtitle. The broadcast receiver reads a PES packet, which has a value '0x20' of a 'data_identifier' field and a value '0x00' of a 'subtitle_stream_id' value, so that it can extract subtitle data using the read PES packet.

The broadcast receiver performs section-filtering of the extracted subtitle data at step S5020. The broadcast receiver performs filtering of detailed information contained in subtitle data, and outputs the filtered information to a corresponding buffer. In this case, the subtitle data may be classified as follows according to values of the 'segment type' field.

0x10 Page Composition Segment (PCS) for Base View
0x11 Region Composition Segment (RCS) for Base View
0x12 CLUT definition segment for both Base View and Extended View
0x13 Object Data Segment (ODS) for Base View
0x14 Display Definition Segment (DDS) for Base View
0x40 extended Page Composition Segment (PCS_EXT) for Extended View
0x41 extended Region Composition Segment (RCS_EXT) for Extended View
0x43 extended Object Data Segment (ODS_EXT) for Extended View
0x44 extended Display Definition Segment (DDS_EXT) for Extended View The broadcast receiver decodes subtitle display information for a base view from the classified DDS, PCS, RCS, and ODS at step S5030. The broadcast receiver decodes the DDS, the PCS, the RCS, and the DDS, so that it can obtain size information of a subtitle to be displayed, position information of the subtitle, object configuration information, object's unique information, and the like. Information needed for the broadcast receiver to display a subtitle at a base view may also be called subtitle control information.

The broadcast receiver decodes the ODS, and parses a Color Look Up Table (CLUT), so that it determines subtitle display color information at a base view at step S5040. The broadcast receiver decodes 'pixel-data_sub-block' data contained in the ODS, so that it can acquire a pseudo-color value of a subtitle to be displayed on a base view graphic plane. The broadcast receiver parses the CLUT, so that it can convert the pseudo-color value into information of a color to be actually displayed.

The broadcast receiver decodes extended subtitle display information for the extended view from the extended DDS, the extended PCS, the extended RCS (or RCS), and the extended ODS (or ODS) at step S5050. The broadcast receiver decodes the extended DDS, the extended PCS, the extended RCS, and the extended ODS (or ODS), so that it can recognize size information of a subtitle to be displayed, position information of the subtitle, object configuration information, object's unique information, and the like. Information needed for the broadcast receiver to display a subtitle at the extended view may also be referred to as extended subtitle control information as necessary.

The broadcast receiver decodes the extended ODS (or an ODS), and parses a CLUT, so that it determines subtitle display color information at a extended view at step S5060. The broadcast receiver decodes 'pixel-data_sub-block' data contained in the extended ODS (or an ODS), so that it can acquire a pseudo-color value of a subtitle to be displayed on the extended view graphic plane. The broadcast receiver parses the CLUT, so that it can convert the pseudo-color value into information of a color to be actually displayed.

In a 3D display, a color of a left view subtitle may be equal to a color of a right view subtitle. In this case, the broadcast receiver may determine only once the color information of a subtitle to be displayed, and may use subtitle color information of other viewpoint by reading the determined color information. In this case, step S5060 may herein be omitted or a process for copying or reading the color information that has been determined at step S5040 may be carried out.

The broadcast receiver controls a subtitle for the base view and a subtitle for the extended view according to individual subtitle control information, and outputs the controlled subtitles at step S5070. The broadcast receiver outputs the base view subtitle along with base view video data according to subtitle control information and outputs the extended view subtitle along with extended view video data according to extended subtitle control information, so that it can display a 3D subtitle.

In the above-mentioned steps, the step for processing subtitle display information for a base view subtitle and the other step for processing extended subtitle display information of an extended view subtitle need not always be carried out in the above order. If necessary, subtitle display information for the extended view may be first carried out, or subtitle display information for the base view and subtitle display information for the extended view may be simultaneously carried out.

Figure 6:
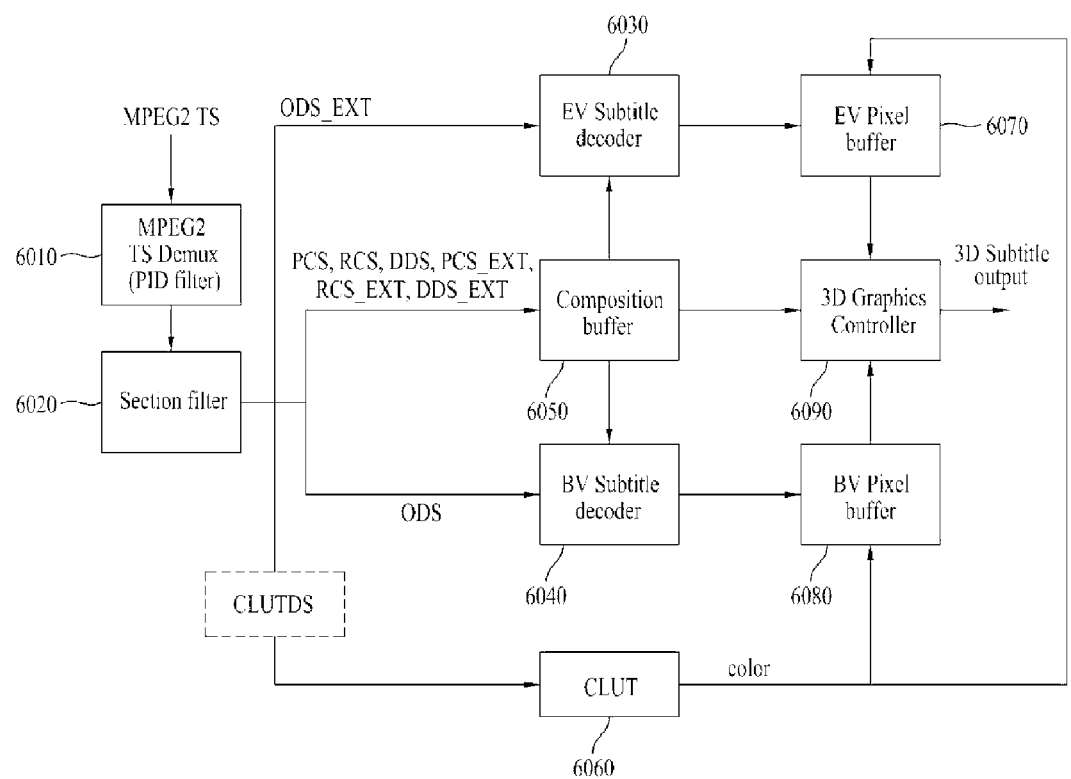
FIG. 6 is a block diagram illustrating a broadcast receiver for receiving and processing 3D subtitle data according to one embodiment of the present invention.

FIG. 6 is a block diagram illustrating a broadcast receiver for receiving and processing 3D subtitle data according to one embodiment of the present invention.

Referring to FIG. 6, the broadcast receiver includes a demultiplexer (denoted by 'MPEG2 TS Demux (PID filter)') 6010, a section filter 6020, an Extended View (EV) subtitle decoder 6030, a Base View (BV) subtitle decoder 6040, a composition buffer 6050, a CLUT processor (denoted by 'CLUT') 6060, an EV pixel buffer 6070, a BV pixel buffer 6080, and a 3D graphics controller 6090.

Constituent components of the broadcast receiver shown in FIG. 6 will hereinafter be described in detail. In more detail, the broadcast receiver shown in FIG. 6 is designed to receive and process the 3D subtitle data shown in FIG. 5. The same or duplicated parts as those of FIG. 5 will be briefly described.

In the broadcast receiver, a receiving unit (not shown) receives a Moving Picture Expert Group 2 Transport Stream (MPEG2 TS) including subtitle data, and the demultiplexer 6010 performs filtering of the received MPEG2 TS using a PID corresponding to subtitle data so that it extracts and outputs subtitle data.

The section filter 6020 performs section-filtering of subtitle data, so that it outputs PCS, PCS_EXT, RCS, RCS_EXT, DDS, DDS_EXT, ODS, ODS_EXT, and Color Look Up Table Definition Segment (CLUTDS) data.

In the following description, the demultiplexer 600 for extracting subtitle data from the received broadcast signal and the section filter 6020 for extracting and outputting display information and CLUTDS of a subtitle may be contained in one extraction unit as necessary.

In this case, PCS, RCS, DDS, ODS, PCS_EXT, RCS_EXT, DDS_EXT, and ODS_EXT may be buffered in the composition buffer 6050, and the buffered results may be applied to the 3D graphics controller 6090. In addition, PCS, RCS, DDS, and ODS may be applied to the BV subtitle decoder 6040, and PCS_EXT, RCS_EXT, DDS_EXT, and ODS_EXT may be applied to the EV subtitle decoder 6030.

The CLUT processor 6060 processes the CLUTDS, so that it outputs display color information to the BV pixel buffer 6080 and the EV pixel buffer 6070.

The BV subtitle decoder 6040 decodes PCS, RCS, DDS, and ODS, so that it decodes subtitle data for the base view and subtitle display information for the base view and outputs the decoded subtitle data and the decoded subtitle display information to the BV pixel buffer 6080. The EV subtitle decoder 6030 decodes PCS_EXT, RCS_EXT, DDS_EXT, and ODS_EXT, so that it decodes subtitle data for the extended view and subtitle display information for the extended view and outputs the decoded subtitle data and the decoded subtitle display information to the EV pixel buffer 6070.

The 3D graphic controller 6090 receives PCS, RCS, DDS, ODS, PCS_EXT, RCS_EXT, DDS_EXT, and ODS_EXT from the composition buffer 6050, and receives subtitle display information for the base view, ODS and color information for the base view from the BV pixel buffer 6080. The 3D graphics controller 6090 receives subtitle display information for the extended view, ODS_EXT and color information for the extended view from the EV pixel buffer 6070. The 3D graphics controller 6090 reads the received information, so that it controls subtitles of respective viewpoints and outputs the controlled subtitles.

In accordance with another embodiment of the present invention, the BV subtitle decoder 6040 decodes the ODS and the EV subtitle decoder 6030 decode the ODS_EXT, so that the BV subtitle decoder 6040 and the EV subtitle decoder 6030 acquire information of a displayed subtitle object. The 3D graphics controller 6090 receives coordinates-, size-, and configuration-information (for example, PCS, RCS, DDS, PCS_EXT, RCS_EXT, and DDS_EXT) of a displayed subtitle object, so that it may control the 3D subtitle display using the received information.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR THE INVENTION

Various embodiments have been described in the best mode for carrying out the invention.

INDUSTRIAL APPLICABILITY

As apparent from the above description, embodiments of the present invention may be wholly or partially applied to a digital broadcasting system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of processing a digital broadcast signal for a 3-dimensional, 3D, content, the method comprising:
encoding video data for the 3D content into a stream, the video data comprising a left picture for a left view and a right picture for a right view for a 3D image;
generating signaling information for the video data, the signaling information including a Program Map table (PMT) providing a mapping between a program number and program elements of a program including the 3D content,
wherein the PMT includes subtitling descriptor including subtitling type information, and
wherein the subtitling type information indicates an existence of a 3D subtitle for the 3D content;
generating packet data for subtitling of the 3D content, the packet data including subtitle segment,
wherein the subtitle segment includes disparity information indicating a difference between horizontal positions of subtitles representing a same point in space in the right and left view of the 3D image for a page; and transmitting the broadcast signal including the video data, the packet data, and the signaling information;

wherein the subtitle segment further includes region information identifying at least one region within the page, and region disparity information indicating differences between horizontal positions of subtitles in the at least one region identified by the region information; wherein the subtitle segment further includes region size information specifying a horizontal width of the at least one region which is expressed in pixels.

2. The method of claim 1, wherein the subtitle segment further includes object information identifying at least one object within the at least one region, and the disparity information indicates differences between horizontal positions of subtitles for the at least one object identified by the object information.

3. The method of claim 1, wherein the broadcast signal further includes range information indicating depth range of the 3D image.

4. The method of claim 3, wherein the range information includes maximum disparity information indicating intended largest disparity of the 3D image and minimum disparity information indicating intended smallest disparity of the 3D image.

5. An apparatus for receiving a digital broadcast signal for a 3-dimensional, 3D, content, the method comprising:

a receiving unit configured to receive a broadcast signal including video data for the 3D content, wherein the video data comprise a left picture for a left view and a right picture for a right view for a 3D image;

signaling information for the video data, the signaling information including a Program Map table (PMT) and to extract packet data for subtitling of the 3D content from the received broadcast signal, wherein the PMT includes subtitling descriptor including subtitling type information, wherein the subtitling type information indicates an existence of a 3D subtitle for the 3D content, wherein the packet data includes a subtitle segment, and wherein the subtitle segment includes disparity information indicating a difference between horizontal positions of subtitles representing a same point in space in the right and left view of the 3D image for a page;

a controller configured to control a display of subtitle in the 3D image for the 3D content based on the subtitling type information and the subtitle segment;

wherein the subtitle segment further includes region information identifying at least one region within the page, and region disparity information indicating differences between horizontal positions of subtitles in the at least one region identified by the region information; wherein the subtitle segment further includes region size information specifying a horizontal width of the at least one region which is expressed in pixels; wherein the subtitle segment further includes region size information specifying a horizontal width of the at least one region which is expressed in pixels.

6. The apparatus of claim 5, wherein the subtitle segment further includes object information identifying at least one object within the at least one region, and the disparity information indicates differences between horizontal positions of subtitles for the at least one object identified by the object information.

7. The apparatus of claim 5, wherein the broadcast signal further includes range information indicating depth range of the 3D image.

8. The method of claim 7, wherein the range information includes maximum disparity information indicating intended largest disparity of the 3D image and minimum disparity information indicating intended smallest disparity of the 3D image.

* * * * *